2,832,045
ELECTROMAGNETIC WAVE POWER MEASURING DEVICE

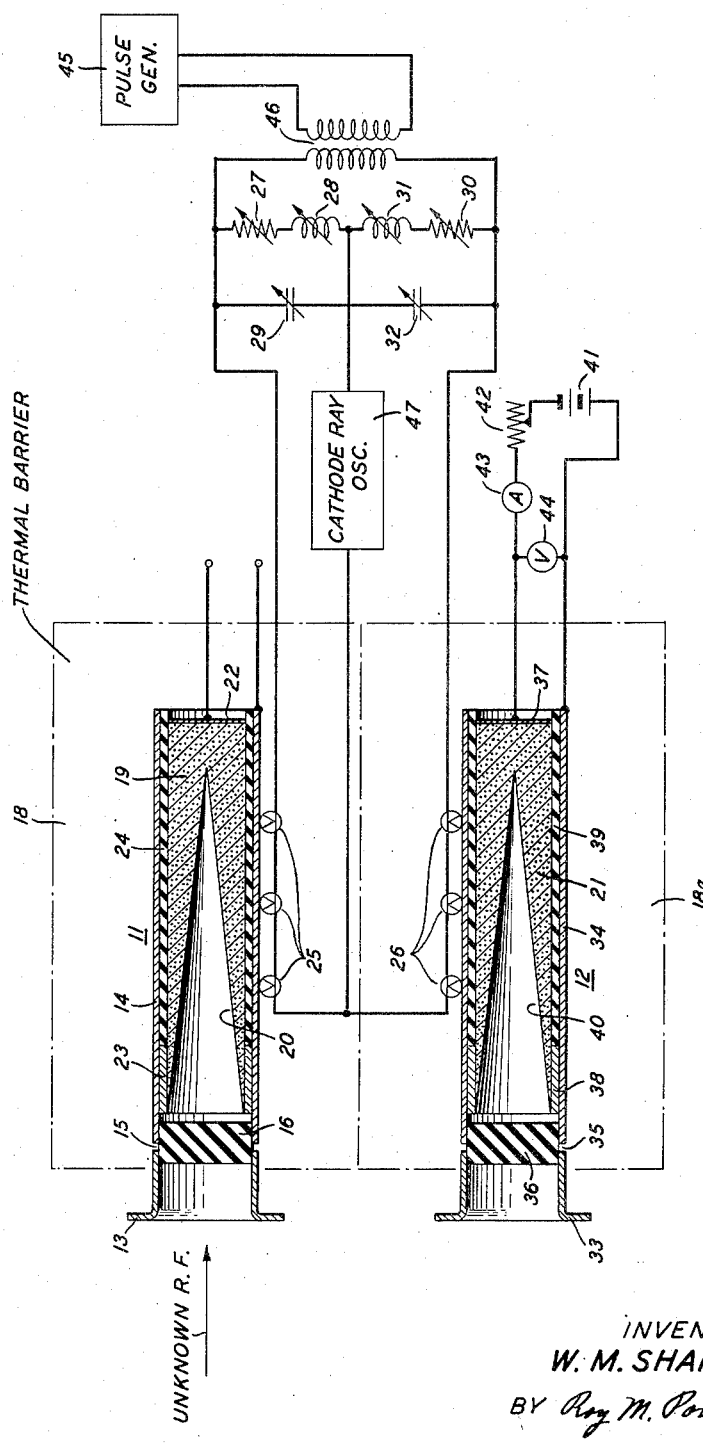

William M. Sharpless, Fair Haven, N. J., assignor to Bell Telephone Laboratories, Incorporated, New York, N. Y., a corporation of New York Application April 28, 1954, Serial No. 426,080

2 Claims. (Cl. 324—95)

This invention relates to radio frequency electromagnetic wave power measurement and, more particularly, to the measurement of microwave and millimeter wave power by calorimeter principles.

A common method of measuring power is to convert the radio frequency energy to be measured into heat in a suitable load, absorber or dissipating body, such as a volume of water flowing through a chamber to which the energy is applied, and matching the temperature of the load with that of a similar heat absorbing body to which the heat generated by a measurable amount of direct current is applied. After a state of thermal equilibrium is reached and when the two bodies have equal temperatures, equal amounts of power will be lost from both bodies. Therefore, the applied, unknown radio frequency power is considered to be equal to the applied direct current power, the latter being measured by conventional apparatus. This method gives fairly satisfactory results when the quantity of energy to be measured is relatively large. In systems, however, where the power is very small as is particularly so in guided wave systems operating at microwave and millimeter wavelengths, the available power is not capable of bringing the dissipating body to a thermal equilibrium condition within any reasonable time. Even under ideally insulating conditions, the time required to reach an equilibrium suitable for taking an accurate measurement is many minutes, often running into the better part of an hour. A similar delay is then experienced while the equipment cools back to normal before another measurement may be made. Furthermore, since the usual calorimeter of this type involves a flowing fluid as the dissipating means, it is difficult to ensure that even after thermal equilibrium temperature is reached, identical powers will be lost by both loads. Calibration is necessary and this then subjects the accuracy of the measurement to ambient temperature variations.

It is therefore an object of the present invention to rapidly measure very small amounts of electromagnetic wave power of extremely short wavelengths.

It is a further object of the invention to make calorimeter type measurements of electromagnetic wave power that are substantially independent of ambient temperature and time considerations.

In accordance with the present invention a comparison is made between a sequence of instantaneous temperature values of two calorimeter absorbers which are particularly designed to convert the unknown radio frequency power and a known amount of much lower frequency power which may be direct current power, into heat at substantially equal rates and upon identical temperature versus time characteristics in the region of progressively increasing temperature substantially below the temperature of thermal equilibrium. The design of these absorbers involves novel means for applying the measured direct current power to its absorber in a way which simulates the non-uniform distribution of the radio frequency power in its absorber. Temperature sensing elements consist of two sets of thermistors, each in contact with one power absorber, and forming two arms of a resistance bridge. By adjusting the direct current power applied to one absorber, the bridge is balanced. Regardless of the starting temperature and regardless of the length of time that power has been applied to the absorbers, a sequence of equal instantaneous temperature values of the absorbers will accurately reflect equal quantities of energy applied to them.

Other objects, features and advantages of the invention will appear more fully upon consideration of the following detailed description taken in connection with the drawing which shows, partially in cross section and partially in electrical schematic, a calorimeter in accordance with a preferred illustrative embodiment of the invention.

Referring to the drawing, two identical calorimeter absorbers 11 and 12 are shown in cross section. Absorber 11 comprises an input wave guide connection 13 which may be of round, rectangular or square cross section, to which the wave energy to be measured may be applied. The cross-sectional dimensions of guide 13 are chosen to support the dominant mode of the wave energy to be measured. Guide 13 couples the energy into a thin tube 14 of low mass which has a cross section corresponding to that of guide 13 and is made of high electrical and thermal conductive material such as silver. Thin thermal breaks or slight gaps 15 are located between the adjacent ends of tube 14 and guide 13 to reduce conduction heat losses from tube 14. Stopper 16 of dielectric material having a dielectric constant substantially equal to that of air, such as polyfoam, is placed at gap 15 to extend within guide 13 and tube 14 to prevent direct air flow through gap 15 or between guide 13 and tube 14 while at the same time allowing substantially unimpeded flow of the electromagnetic wave energy. A similar guide 33, gap 35, stopper 36, and tube 34 comprise absorber 12. Absorbers 11 and 12 are each located in suitable thermally insulating media, indicated schematically on the drawing by thermal barriers 18 and 18a, respectively.

Located within tube 14 is dissipating member 19 comprising an axially extending block or cylinder, depending upon the cross section of tube 14, of electrically resistive material. Member 19 must have dissipative and absorption properties to radio frequency wave energy applied to it and at the same time provide a resistive path for direct currents as will be considered in more detail hereinafter. It is therefore apparent that the many lossy dielectric materials employed for wave guide terminations will not be satisfactory since these materials are most commonly insulators at direct currents. It has been determined that a compound of finely divided resistive material, such as carbon black, suspended in a phenol resin cement in proportion to provide a direct current resistivity in the order of 20 ohm-centimeters is satisfactory. In particular, a material of this type is obtained by combining substantially equal parts of the commercially available compounds Resistoplast and Conductoplast, marketed by the Atlas Mineral Products, Inc., Mertztown, Pennsylvania.

The basic operation of the present invention involves converting the unknown radio frequency power into heat in one of the dissipating members 19 or 21 and converting a known amount of much lower frequency power, preferably direct current power, into heat in the other member at substantially equal rates and with substantially the same form of distribution of the power in each member. The nature of high frequency and direct current dissipation is quite different. If a mass of dissipating material is located in the propagation path of the high frequency wave, the first three decibels of attenuation of the material will dissipate one half of the power, the next three decibels will attenuate one half of that remaining and so on to the end of the termination. This is true regardless of the shape, size or resistivity of the member. It is therefore seen that the concentration of dissipated wave energy is much greater in the early portion of a homogenous member encountered first by the energy than in the following portions.

The dissipation of the low frequency or direct current involves other considerations since the application of this power to the member is made by way of a two wire circuit and a current path through the material between a pair of contacts. An equal amount of the power will be dissipated in each longitudinal portion of the material along this path. However, the concentration of the dissipation in each portion depends upon the mass of material in that portion and upon the effective surface area and shape of the contacts. Effective surface area of a contact is taken to be that area toward or from which the current will converge or spread out in the material and is an approximate projection of the actual area upon a surface that is normal to the direction of current flow. It is therefore possible to control the concentration of the direct current so that it duplicates the concentration of the high frequency energy.

This is done as shown in the drawing by first tapering the mass of members 19 and 21 from a minimum mass in the cross section of the early portion of each, adjacent guides 13 and 33, and axially increasing the mass with distance from the source of radio frequency energy to a maximum cross section at the other end. In the embodiment illustrated, this tapered mass is provided by axially extending conical depressions 20 and 40 each several wavelengths long, but it should be noted that other forms of tapered mass are also satisfactory. In addition to affecting the concentration pattern of the dissipated direct current power, tapers 20 and 40 also serve to reduce and prevent reflections of the high frequency wave energy applied from guides 13 or 33 to members 19 and 21, respectively.

A first electrical contact for each member 19 and 21 is provided at a location adjacent the greatest mass of the members. These first contacts comprise axially located transverse end plates 22 and 37 which each have a cross-sectional area slightly less than the end areas of members 19 and 21. Since the contacting surfaces of plates 22 and 37 are oriented in planes predominantly normal to the longitudinal path of current flow through members 19 and 21, these contacts provide effective contact areas substantially equivalent to their actual surface areas. A second electrical contact for each member 19 and 21 is provided at a location adjacent the smallest mass of the members. These second contacts comprise narrow circumferential bands 23 and 38, respectively, of conductive material extending around the early portion of members 19 and 21 and making a connection therefrom to conductive tubes 14 and 34. The remaining portions of members 19 and 21 are insulated from tubes 14 and 34 by thin sleeves 24 and 39 of insulating material such as mica. Since the contacting surfaces of bands 23 and 38 lie in planes that are predominantly parallel to the longitudinal path of current flow, these contacts provide limited effective contact areas as compared to their actual surface area. The effective contacting areas of bands 23 or 38 should be less than the effective contacting areas of plates 22 or 37, respectively. Thus when a direct current potential is applied between plate 22 and tube 24 of absorber 11 or between plate 37 and tube 34 of absorber 12, direct current power is dissipated in members 19 or 21 with a minimum concentration adjacent plates 22 or 37 since the current tends to spread out over their total effective areas. The concentration progressively increases toward the early portion because there is progressively less mass for the current to pass through and because the distribution of the current is converged toward the smaller effective contact area of bands 23 and 38. In general, this is the distribution of the high frequency energy described above and by making an initial calibration adjustment of the width of bands 23 and 38, direct current can be made to flow through members 19 or 21 with a distribution which is substantially identical to the above described radio frequency distribution. Since members 19 and 21 are of like size, shape and material and since the distribution of the direct current is like the radio frequency current, members 19 and 21 will have corresponding temperature versus time characteristics for both types of current at every power level.

Means are provided for indicating a state of equality of heat developed in absorbers 11 and 12. As illustrated in the drawing this means comprises a first set of thermistor elements 25 located in intimate contact with the outer wall of tube 14 and a second set of elements 26 for tube 34. While illustrated schematically on the drawing as spaced longitudinally along the length of tubes 14 and 34, it is preferable that elements 25 and 26 be also distributed around the perimeter of tubes 14 and 34. The thermistor elements should be especially selected for similarity. Elements 25 and 26 form two arms of a bridge network, of which the series combination of variable resistance 27 and inductance 28, shunted by capacitor 29, forms a third arm. A similar combination of resistance 30, inductance 31 and capacitor 32 forms the fourth arm. In order that the measuring signal power in the bridge be low, the bridge balance is sampled by a pulse signal of low power and very short duration which is supplied by generator 45 through transformer 46 across one side of the bridge. The balanced condition of the bridge is indicated by a cathode ray oscilloscope 47 connected across the other side of the bridge. In practice a four microsecond pulse is impressed at a repetition rate of 300 pulses per second which results in each thermistor receiving less than a milliwatt of standby power. Since such a pulse involves many high frequency components, inductances 28 and 31 and capacitors 29 and 32 may be variable and are provided to afford a reactive balance of the bridge in addition to the resistive balance supplied by resistors 27 and 30.

In operation one of the two absorbers 11 or 12 is connected to the source of unknown radio frequency power. As shown on the drawing, this comprises absorber 11. The other is connected to a source of measured direct current. As shown on the drawing, the direct current connection is made to absorber 12 from source 41 through rheostat 42, the power measuring combination of ammeter 43 and voltmeter 44 to contact 37 and tube 34 of absorber 12. Obviously, absorbers 11 and 12 may be interchanged with respect to the above described connections.

The bridge is first brought to balance in a standby condition with neither radio frequency power nor direct current power applied to the terminations. This balance is indicated by a null condition shown on oscilloscope 47 by a line with no pulse showing. The unknown high frequency signal to be measured is then introduced to guide 13 which causes the temperature of member 19 to rise along a given temperature versus time characteristic. This temperature increase changes the resistance of thermistors 25 and unbalances the bridge so that a pulse appears on oscilloscope 47 which is either positive or negative depending upon the connections of the circuit. An equal amount of direct current power is then applied to member 21 by adjusting rheostat 42 until the bridge returns the balance. Too much or too little direct current power will show up as a positive or negative pulse on oscilloscope 47 and the exact direct current equivalent of the high frequency power will be indicated by a null on oscilloscope 47. Such a null indicates that the increasing instantaneous temperatures of the two members 20 and 21 are equal, i. e., that they are both heating up on identical temperature versus time characteristics. The time taken to reach this balance in general is only a matter of a few seconds, but the steadiness of the balance may, if desired, be observed for several minutes. The measurement of the high frequency power thus becomes a matter of direct current power measurement and precision direct current instruments 43 and 44 may be employed if high accuracy is desired.

In an embodiment of the invention that has been reduced to practice for operation in the millimeter range, the calorimeter sensitivity is such that a temperature change of approximately $\frac{1}{1000}$ of a degree centigrade in either termination 19 or 21 is detectable. During the measurement of high frequency powers of the order of a few milliwatts, a change in temperature of a few tenths of a degree takes place in the terminations in a matter of about 100 seconds. With this sensitivity measurement of power levels of the order of one milliwatt can be made in the millimeter wavelength range with an accuracy of about plus or minus one quarter decibel.

In all cases it is understood that the above described arrangement is simply illustrative of one of the many possible specific embodiments which can represent applications and principles of the invention. Numerous and varied other arrangements can readily be devised by those skilled in the art without departing from the spirit and scope of the invention.

What is claimed is:

1. Power measuring apparatus comprising two sections of shielded transmission line for high frequency electromagnetic wave energy, axially extending electrically dissipative material increasing in mass from a minimum to a maximum cross-sectional area within each of said lines, means for propagating wave energy to be measured into the material in one of said lines in the direction of said increasing mass so that said energy is dissipated in said material in greater concentration in the portion of said member of minimum cross section than in the portion of said member of maximum cross section, a pair of electrode contacts contacting respectively said minimum and maximum cross sections of the material in the other of said lines for passing a measured direct current through said material between substantially said minimum and maximum cross sections in a concentration that is greater in the portion of said member of minimum cross section than in the portion of said member of maximum cross section, and means for indicating a state of equality of heat developed in the material in said two lines.

2. Apparatus for measuring the output from a source of high frequency electromagnetic wave energy comprising a first dissipative body in the path of said energy having a tapered portion of dissipative material axially increasing in mass with distance from said source whereby said energy is dissipated according to a given pattern in said body, a second dissipative body substantially identical to said first body, a source of measured electrical power connected between a pair of conductive elements each contacting an effective surface area of said second body at locations of different mass, the effective surface area of the contact at the location of larger mass being larger than the effective surface area of the contact at the location of smaller mass whereby said measured power is dissipated in said second body in a pattern like said given pattern, and means for comparing the heat developed by said dissipated energy in said two bodies.

References Cited in the file of this patent

UNITED STATES PATENTS

| | | |
|---|---|---|
| 2,398,606 | Wang | Apr. 16, 1946 |
| 2,497,094 | Moreno | Feb. 14, 1950 |
| 2,646,549 | Ragan | July 21, 1953 |
| 2,676,307 | Anderson | Apr. 20, 1954 |